(12) United States Patent
Mehler

(10) Patent No.: US 8,353,284 B1
(45) Date of Patent: Jan. 15, 2013

(54) SELF-CONTAINED SOLAR HEATER AND STORAGE DEVICE

(76) Inventor: Vern A Mehler, South Bend, IN (US)

( * ) Notice: Subject to any disclaimer, the term of this patent is extended or adjusted under 35 U.S.C. 154(b) by 372 days.

(21) Appl. No.: 12/587,741

(22) Filed: Oct. 13, 2009

Related U.S. Application Data

(63) Continuation-in-part of application No. 11/391,057, filed on Mar. 28, 2006, now abandoned.

(51) Int. Cl.
*F24J 2/44* (2006.01)
*F24J 2/04* (2006.01)
*F24J 2/42* (2006.01)

(52) U.S. Cl. ........ 126/570; 126/621; 126/639; 126/640; 126/643; 165/48.2; 165/49

(58) Field of Classification Search .......... 126/570, 126/639, 640, 621, 642, 634, 638, 641, 643; 165/48.2, 49
See application file for complete search history.

(56) References Cited

U.S. PATENT DOCUMENTS

| 705,167 | A | * | 7/1902 | Walker | 126/616 |
|---|---|---|---|---|---|
| 705,350 | A | | 7/1902 | Hubert | |
| 735,321 | A | * | 8/1903 | Walker | 126/611 |
| 921,976 | A | * | 5/1909 | Glass | 126/640 |
| 1,702,974 | A | | 2/1929 | MacDonald | |
| 1,989,999 | A | * | 2/1935 | Niederle | 126/639 |
| 2,388,940 | A | | 11/1945 | Taylor | |
| 4,044,948 | A | * | 8/1977 | Bottum et al. | 126/587 |
| 4,054,981 | A | * | 10/1977 | Bridgegum | 29/890.033 |
| 4,056,093 | A | * | 11/1977 | Barger | 126/592 |
| 4,116,223 | A | | 9/1978 | Vasilantone | |
| 4,256,814 | A | * | 3/1981 | Avigal et al. | 429/111 |
| 4,346,731 | A | * | 8/1982 | Sigworth, Jr. | 137/433 |
| 4,355,628 | A | * | 10/1982 | Watts | 126/609 |
| 4,401,140 | A | | 8/1983 | Vogel | |
| 4,416,257 | A | * | 11/1983 | Bale | 126/610 |
| 4,419,983 | A | | 12/1983 | Holland | |
| 4,452,231 | A | | 6/1984 | El-Shayeb | |
| 4,501,374 | A | | 2/1985 | Robertson | |
| 4,520,795 | A | * | 6/1985 | Parkyn et al. | 126/610 |
| 4,535,754 | A | | 8/1985 | Darr | |
| 4,537,180 | A | | 8/1985 | Minor | |
| 4,602,617 | A | * | 7/1986 | Clegg | 126/640 |
| 4,708,167 | A | | 11/1987 | Koyanagi | |
| 4,756,300 | A | * | 7/1988 | Ewers | 126/567 |
| 4,757,803 | A | | 7/1988 | Dixon | |
| 5,054,453 | A | | 10/1991 | Onufer | |
| 5,144,986 | A | | 9/1992 | Drew | |
| 5,327,871 | A | | 7/1994 | Gryc | |
| 5,462,047 | A | | 10/1995 | Kleinwachter et al. | |
| 6,089,271 | A | | 7/2000 | Tani | |

(Continued)

FOREIGN PATENT DOCUMENTS

| JP | 60175966 A | * | 9/1985 |
|---|---|---|---|
| JP | 2005195196 A | * | 7/2005 |

*Primary Examiner* — Steven B McAllister
*Assistant Examiner* — Daniel E Namay
(74) *Attorney, Agent, or Firm* — Faegre Baker Daniels, LLP

(57) ABSTRACT

A solar water-heating apparatus comprises an outer container sized and configured to receive a smaller inner container. The inner container includes an opening formed in an upright wall and an opening formed in a floor. A gap is located between the two containers. Once the device has been filled with a liquid, the liquid present within the gap may be heated by solar energy. The device may include a valve to prevent unintended flow of the liquid.

18 Claims, 16 Drawing Sheets

U.S. PATENT DOCUMENTS

| | | | |
|---|---|---|---|
| 6,827,082 B1 * | 12/2004 | Kogan et al. | 126/680 |
| 2003/0230300 A1 * | 12/2003 | Luo | 126/638 |
| 2004/0050437 A1 | 3/2004 | Engel | |
| 2004/0187862 A1 * | 9/2004 | Cobos, Jr. | 126/657 |

* cited by examiner

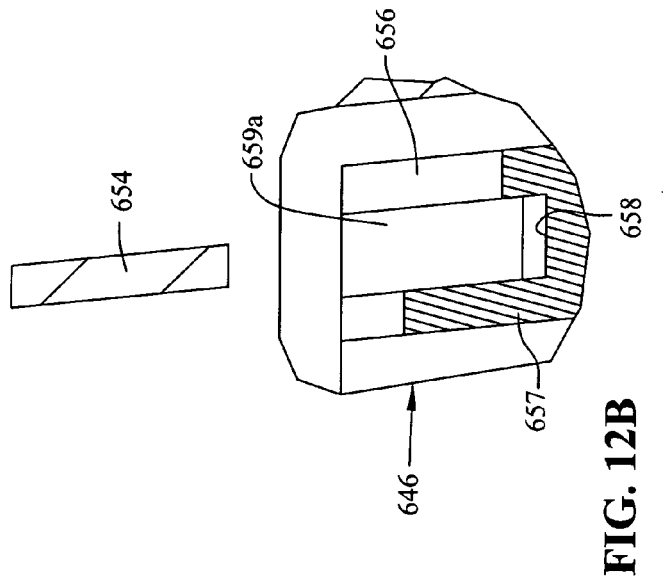
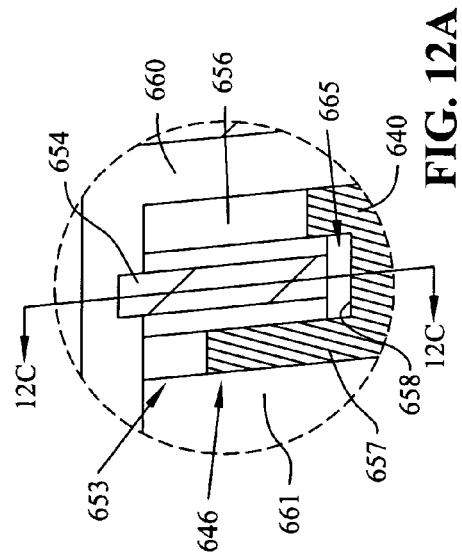
FIG. 12A
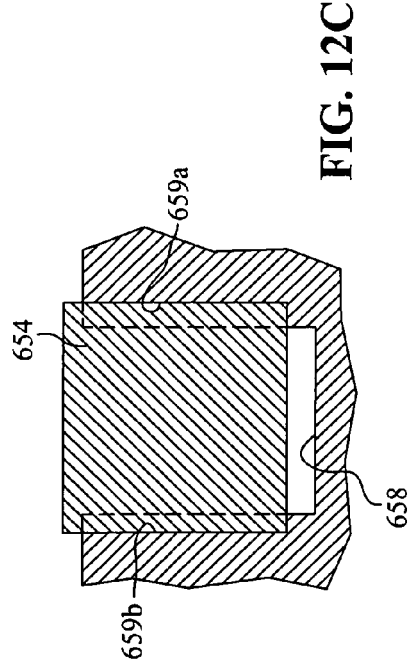
FIG. 12B
FIG. 12C

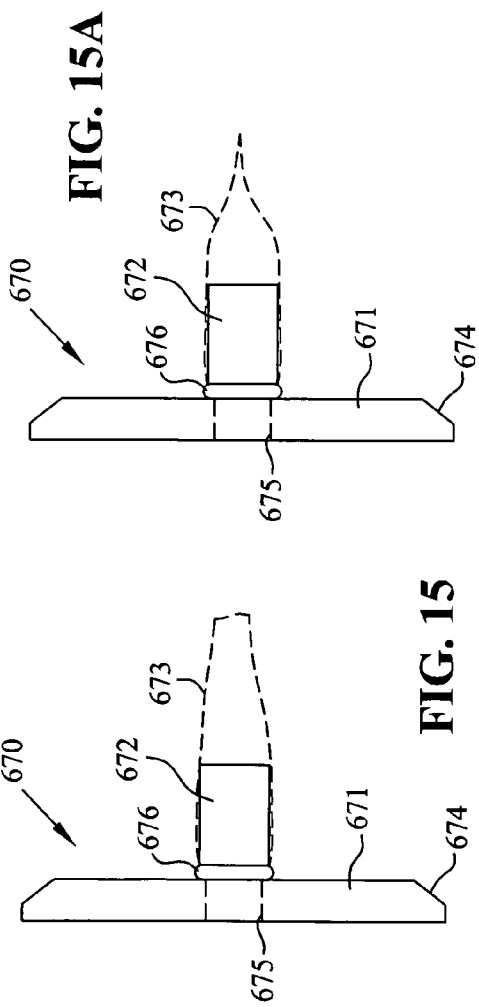
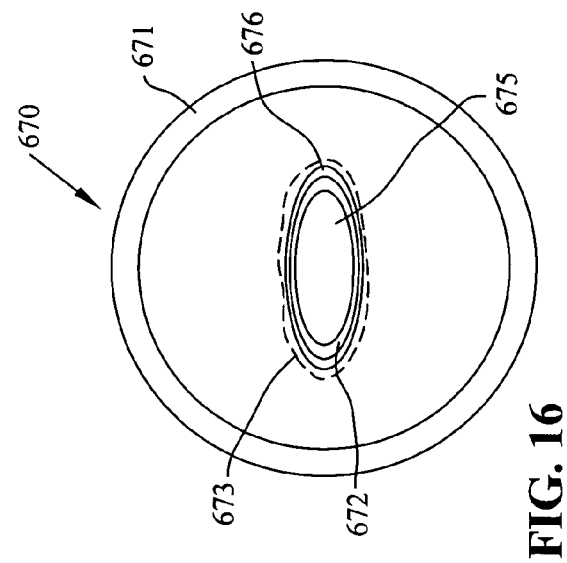

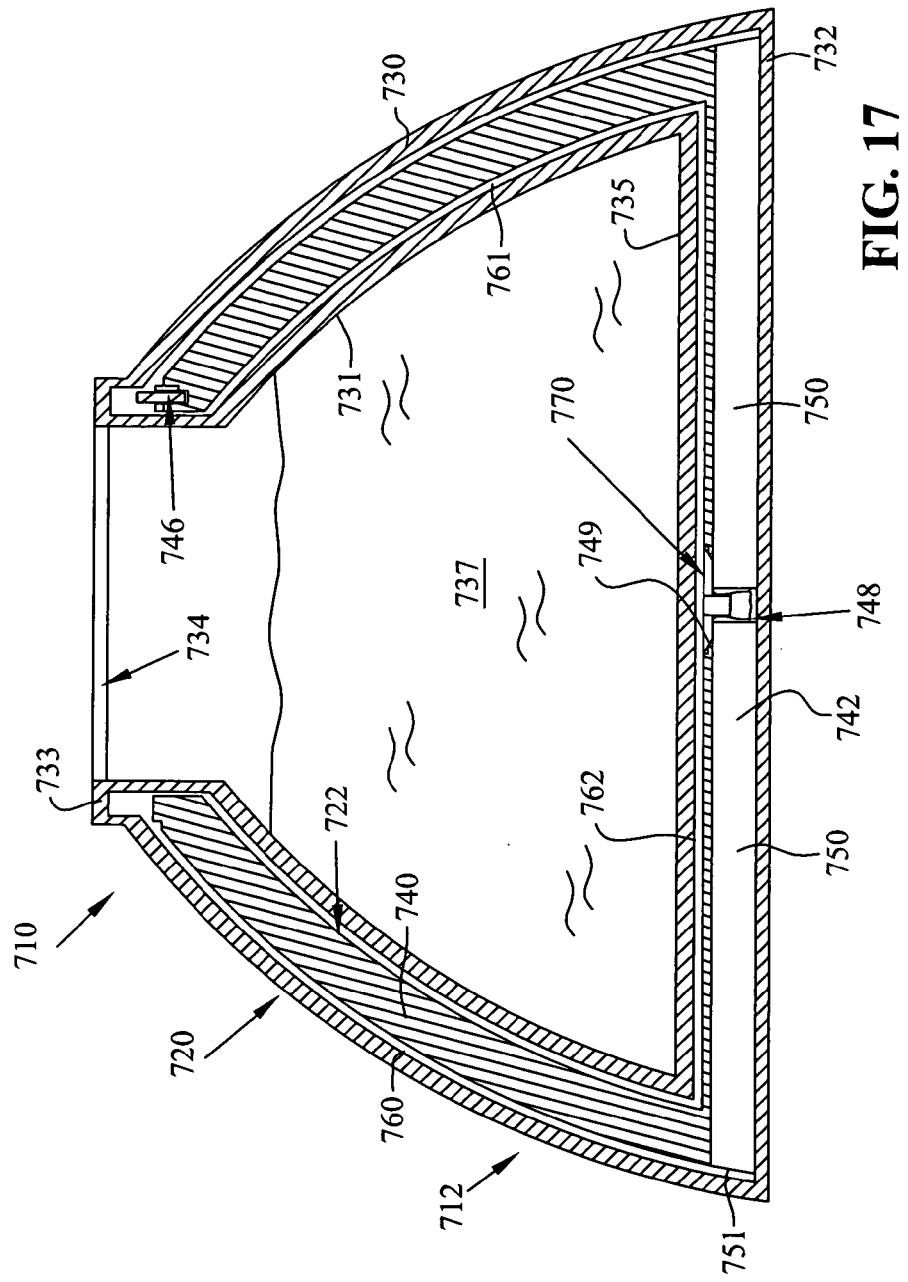

SELF-CONTAINED SOLAR HEATER AND STORAGE DEVICE

This Continuation-In-Part application claims the benefit of U.S. patent application Ser. No. 11/391,057 filed Mar. 28, 2006, the complete disclosure of which is hereby expressly incorporated by reference.

BACKGROUND OF THE INVENTION

The present invention relates generally to the field of solar heaters. In particular, the invention relates to a solar heater capable of heating and storing a liquid.

DESCRIPTION OF PRIOR ART

U.S. Pat. No. 2,388,940 discloses a Solar Heater. The disclosed solar heater is designed primarily to utilize the heat rays from the sun for assistance in home heating after sundown or during parts of the day when the sun is not shining. The invention provides for a self-contained solar heater comprising a tank adapted to contain water or other liquids. The tank includes a heating chamber and a storage chamber in open communication with each other. In the disclosed invention, the water heated in the heater chamber is utilized to circulate the water through both the heater chamber and the storage chamber. Sunlight subjected to the heating chamber warms the water contained therein. Once the water has been warmed by the sun, the tank radiates heat for a predetermined period. The solar heater may also be configured to function as a domestic hot water heater.

U.S. Pat. No. 4,419,983 discloses a Device for Passive Solar Heating and Storage of a Liquid. The disclosed invention includes a passive stationary collector. The collector comprises a cylinder with a substantially circular cross-section set in a fixed position, with its longitudinal axis orientated essentially in a vertical north/south plane and at an appropriate angle to a local horizontal plane of the earth. The invention includes a plurality of liquid carrying heat absorbing conduits laying lengthwise on the external surface of the cylinder. The conduits convey heated liquid to the upper part of the reservoir internal to the cylinder. In addition, the conduits obtain cooler water from the lower part of the reservoir. The invention further includes a liquid density trap positioned between the reservoir and the conduits. The liquid density trap prevents cooling of the reservoir contents during periods of low radiation by the sun.

U.S. Pat. No. 4,452,231 discloses Integral Solar Water Heaters. The disclosed water heating apparatus comprises a plurality of longitudinal tubular storage tanks. Adjacent tanks are aligned in the same direction and in the same plane. An aperture located at the bottom of each tank receives a cold water inlet pipe, and an aperture in the upper portion of the tank receives a hot water outlet pipe. Each tank in the array includes a heat conducting plate, and each plate includes a pipe connected thereto. The pipe for each tank is connected to the tank at two points by two openings. The first end of the pipe is connected to the tank near the bottom, while the second end of the pipe is connected to the tank near the top. The second opening near the top of the tank is covered by a counterbalanced valve member. The counterbalanced valve member is pivotally mounted to the tank and is constructed to block the second opening for flow pressures below a given pressure. Accordingly, as cold water is directed into the heater through the cold water inlet pipe, the cold water enters the pipe associated with the plate. Solar energy heats the water in the pipe, creating density changes and causing the water to rise through the pipe towards the top opening. When a particular pressure is reached due to the density change, the valve pivots and thus causes the heated water to flow back into the tank. In this manner, water will continue to circulate until the entire temperature of the storage tank reaches an ambient value. The presence of the valve prevents the water from cooling during the night.

U.S. Pat. No. 5,462,047 discloses a Solar Water-Heater With Integrated Storage. The disclosed hot water heater is configured to be filled isothermally with water at any temperature. Once the tank is full, the tank begins a thermo-siphoning mode. A collector and a storage tank are housed in a unit. The invention combines two principles of solar hot water heating into one. Primarily, cold water is raised to the desired final temperature in one pass through the absorber, thereby achieving good collector efficiencies and a quick response. In addition, once the storage is full, thermo-siphoning circulation sets in automatically and further heats the storage content and/or compensates for heat losses.

SUMMARY OF THE INVENTION

An embodiment of the present invention includes a solar heater for heating a liquid comprising a first container having an upright wall and a second container located within the first container and including an upright wall. The solar heater includes a gap intermediate the walls of the containers. The gap extends around the second container and encompasses the upright wall of the second container.

In an embodiment of the invention, the second container includes a floor connected to the wall of the second container. The wall of the second container includes an aperture, and the floor of the second container includes an aperture. In addition, the first container includes a floor connected to the wall of the first container and an aperture removed from the floor. In an embodiment of the invention, the solar heater includes an upright wall defining the aperture in the first container. The solar heater may also include a cap for mating with the upright wall in order to seal the aperture of the first container. The cap may include threads capable of mating with threads in the upright wall encompassing the aperture of the first container.

In an embodiment of the invention, the second container includes a reservoir for holding the liquid. The reservoir is connected to the gap by an aperture. The invention may also include a valve capable of sealing the aperture in the wall of the second container. The valve prevents the flow of liquid through the aperture when the valve seals the aperture. In an embodiment of the invention, an adhesive attaches the valve to the wall of the second container.

In an embodiment of the invention, the solar heater includes a plurality of ribs. The ribs reside within the gap. In addition, in an embodiment of the invention, the first container and the second container each have a conical cross-section.

In an embodiment of the invention, the solar heater includes a heat exchanger disposed within the reservoir. In addition, the solar heater may include reflectors configured to direct sunlight toward the gap. The reflectors may be arranged on a mat.

In an embodiment of the invention, the solar heater includes a spigot assembly interconnected with the reservoir. The spigot assembly may be configured to drain liquid from the reservoir. The spigot assembly may include a tube and a float. In addition, the spigot assembly may further include a second tube and a valve.

In an embodiment of the invention, the solar heater includes a valve assembly configured to allow the flow of liquid into the reservoir. The valve assembly may include a valve, a float, and a connector connecting the float to the valve. The float is capable of floating on the top of the liquid and causing additional liquid to flow into the reservoir when the liquid level reaches a predetermined level.

An embodiment of the invention may include a valve including a base including a first member, an aperture formed in the first member and a second member connected to the first member; and a portion including an aperture at least partially aligned with the aperture in the first member, wherein the portion is located at least partially between the first and second members of the base.

An embodiment of the invention may include a valve including a base including a gap and an opening; and a body including a first end, a second end, a first opening located proximate the first end and a second opening located proximate the second end; wherein at least a portion of the body extends through the gap.

BRIEF DESCRIPTION OF THE DRAWINGS

These and other features of the invention will become more apparent and the present invention will be better understood upon consideration of the following description and the accompanying drawings, wherein:

FIG. 12A depicts an enlarged view of a baffle in the area indicated in FIG. 12;

FIG. 12B depicts an enlarged exploded view of the baffle area;

FIG. 12C depicts a sectional view of the baffle taken along line 12c-12c in FIG. 12A;

FIG. 15 depicts a side view of the check valve of FIG. 13 in an open position;

FIG. 15A depicts a side view of the check valve of FIG. 13 in a closed position;

FIG. 16 depicts a plan view of the check valve of FIG. 13; and

FIG. 17 depicts a sectional view of yet another embodiment of the present invention.

Corresponding reference characters indicate corresponding parts throughout the several views. The exemplifications set out herein illustrate preferred embodiments of the invention, and such exemplifications are not intended to be construed as limiting the scope of the invention in any manner.

DETAILED DESCRIPTION OF EMBODIMENTS
OF THE INVENTION

Figure 1:
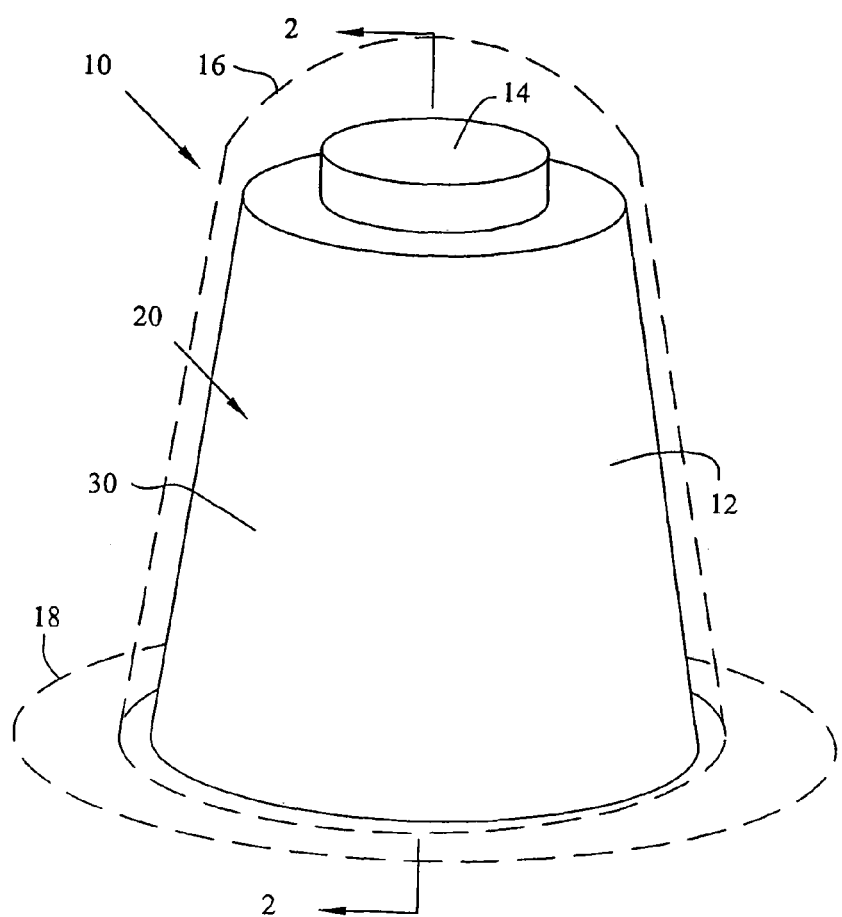
FIG. 1 depicts a perspective view of an embodiment of the present invention.

FIG. 1 depicts a perspective view of an embodiment of the present invention. In FIG. 1, numeral 10 generally indicates a self-contained solar heater and storage device. In the present embodiment, device 10 includes a body portion, generally indicated by numeral 12, a mating cap 14, transparent cover 16 and reflector mat 18.

Figure 2:
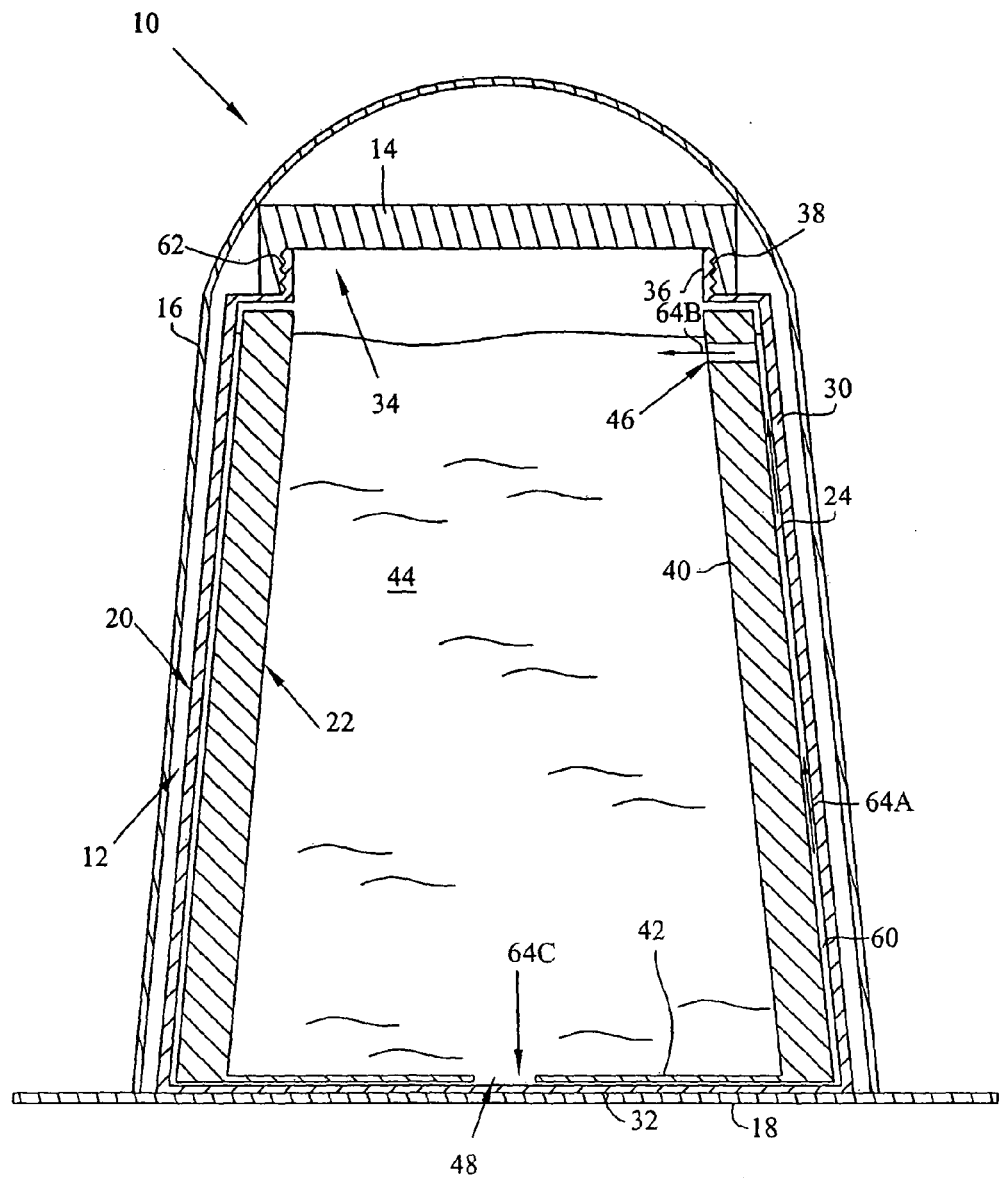
FIG. 2 depicts a sectional view of the invention depicted in FIG. 1.

FIG. 2 depicts a section view of device 10 taken along section line 2-2 of FIG. 1. Body portion 12 includes a first container 20 and a second container 22. In the embodiment depicted, body portion 12 further includes insulation 24.

In the embodiment depicted, first container 20 includes a side wall 30 and a floor 32. In the present embodiment, side wall 30 has a conical cross-section. Floor 32 mates with side wall 30 along the lower edge of side wall 30 in such a manner as ensuring a liquid tight seal. In the present embodiment, first container 20 further includes an opening 34 opposite floor 32. In the embodiment depicted, a raised portion 36 defines opening 34. Raised portion 36 includes threads, generally indicated by numeral 38.

In the present embodiment, side wall 30 is manufactured from a material capable of absorbing solar energy, such as metal or plastic, for example. In embodiments, the plastic may be manufactured from polyethylene. In embodiments of the invention, it is preferable that this material have maximum solar absorption capability and thus, side wall 30 may allow for the use of a wall 30 with a thinner cross-section than would be utilized in an application in which the outer wall provides insulation. The outer surface of side wall 30 is colored black in order to achieve maximum solar energy absorption. In addition, in embodiments of the invention, the inner surfaces of walls 30 and floor 32 are substantially smooth.

Second container 22 includes side wall 40 and floor 42. In the present embodiment, the connection between side wall 40 and floor 42 is liquid tight and prevents liquid from flowing there between. In addition, side wall 40 has a conical-shaped cross-section, as depicted in FIG. 2. It should be noted that if desired first container 20 and second container 22 may have cross-sections other than conical. For example, first container 20 and second container 22 may have hemispherical shapes.

The combination of side wall 40 and floor 42 defines an inner area or reservoir, generally indicated by numeral 44. As shown in FIG. 2, side wall 40 and floor 42 may include or be manufactured from an insulative material having a relatively thicker cross-section, such as plastic. For example, second container 22 may be manufactured from polystyrene or polyurethane.

Referring still to FIG. 2, side wall 40 includes an opening 46. In the present embodiment, opening 46 is located in side wall 40 at an end opposite where side wall 40 joins with floor 42. In addition, floor 42 also includes an opening 48. Opening 48 may be positioned anywhere within floor 42.

Referring still to FIG. 2, first container 20 is sized and configured to receive second container 22. Accordingly, the outer surfaces of side wall 40 and floor 42 are separated from the inner surfaces of side wall 30 and floor 32. Numeral 60 generally indicates the gap defined by the separation. It should be noted that opening 46 and opening 48 both extend from reservoir 44 into gap 60. In addition, it should further be noted that gap 60 is substantially constant in size around the circumference of side wall 40.

Referring still to FIG. 2, cap 14 includes a plurality of threads 62. In the present embodiment, threads 62 are configured to mate with threads 38. Accordingly, cap 14 may be threaded onto first container 20, thereby sealing off access to reservoir 44. When a user desires access to reservoir 44, however, the combination of threads 38 and 62 allows a user to remove cap 14 from body portion 12. In the present embodiment, cap 14 is manufactured from an insulative material in order to minimize any heat loss from the device 10.

Operation of the device 10 will now be described. Device 10 functions by absorbing solar energy and heating any liquid stored therein. In the present example, water will be used for exemplary purposes. However, it should be noted that device 10 is not limited to the heating of water, but rather will succeed in heating any liquid. The first step in the usage of device 10 requires the removal of cap 14 from body portion 12. This may be accomplished in the present embodiment by rotation of cap 14 in order to disengage threads 62 from threads 38. Once cap 14 has been removed from body portion 12, the liquid to be heated by the device 10 is added to reservoir 44. As should be understood by one skilled in the art, the opening 48 in floor 42 allowing flow from reservoir 44 into gap 60 will ensure that the level of liquid in gap 60 is substantially equivalent to the level of liquid in reservoir 44. A sufficient amount of liquid should be added to device 10 in order to ensure that the liquid level rises above the level of opening 46 in side wall 40.

After the device has been filled with a sufficient volume of liquid, cap 14 may be reattached to body portion 12. Device 10 may then be set out in the sunlight in order to absorb solar energy. It should be noted that in the present embodiment of the invention, the conical arrangement of side walls 30 and 40 ensures that more solar radiation is absorbed by device 10 from the sun than that which would be absorbed if device 10 had a cylindrical orientation. This occurs because the conical shape presents a greater surface area to the sun than that which would be achieved if a cylindrical shape were used.

The solar energy transmitted from the sun to device 10 may be absorbed by a portion of side wall 30 and transferred to the water contained within gap 60. This transfer of solar energy results in the increase in the temperature of the water. As the water temperature increases, the density of the water decreases. Accordingly, water with an increased temperature will begin to flow upward in the direction of arrow 64A.

The warm water continues warming within device 10 and continues to migrate within gap 60 until the water reaches opening 46. Once the water reaches opening 46, the water travels through opening 46 into reservoir 44 as indicated by arrow 64B. The water entering reservoir 44 along the line of arrow 64B is warmer than the water already present within reservoir 44. Accordingly, the warmer water will remain in the upper portion of reservoir 44. In order to accommodate the arrival of this warmer water, cooler water near the bottom of reservoir 44 is forced out of reservoir 44 through opening 48 as indicated by arrow 64C.

This cooler water travels through the portion of gap 60 intermediate floor 32 and floor 42 until the water reaches the area of gap 60 intermediate side wall 30 and side wall 40. At this point, the sun again heats the water, thereby causing the liquid to migrate as indicated by arrow 64A. This process may repeat itself until a steady state temperature has been reached. It should be noted that this process will succeed in heating a liquid which has a higher density at cooler temperatures, such as water. Theoretically, during the heating of a liquid that achieves a greater density at higher temperatures, the opposite would happen. Specifically, cooler liquid would exit reservoir 44 through opening 46, travel downward through the portion of gap 60 intermediate side wall 30 and side wall 40, and return into reservoir 44 at a warmer temperature through opening 48. It should be noted in embodiments of the invention a transparent cover 16 may encompass the device 10 in order to entrap heat. In addition, the inventor also foresees the use of reflectors to increase the amount of sunlight directed upon body portion 12. For example, body portion 12 may sit upon a reflector mat 18 capable of reflecting sunlight onto side wall 30. Reflector mat 18 represents a mat manufactured of reflective material capable of redirecting sunlight toward body portion 12.

When one wishes to remove the warm water contained by the device 10, one need only unscrew mating cap 14. The removal of cap 14 presents one with access to reservoir 44. One may then remove water from the reservoir 44 as one desires. In order to function properly again, additional water must be added to reservoir 44 in order to ensure the level of the water is above opening 46.

Figure 3A:
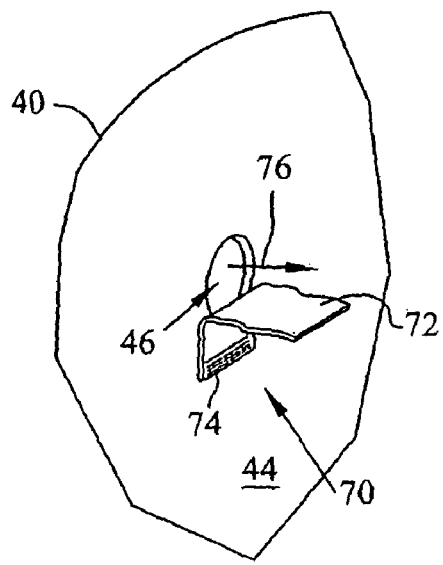
FIGS. 3A and 3B depict an embodiment of a valve that may be used in an embodiment of the invention.
Figure 3B:
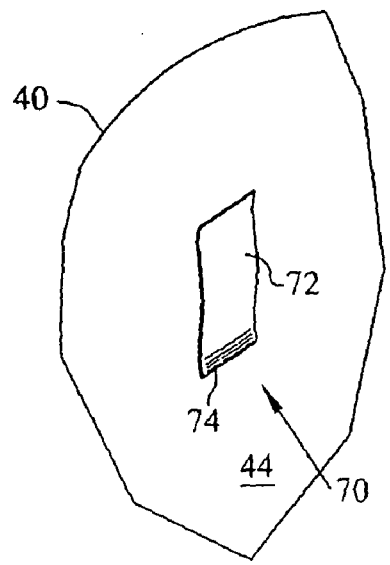

FIGS. 3A and 3B depict a check valve 70 which may be employed in embodiments of the invention. Check valve 70 is configured to be used in conjunction with opening 46 when water or a similar liquid is being heated. In the embodiment shown, check valve 70 comprises a plastic body 72 and an adhesive 74. Plastic body 72 is generally manufactured from a plastic material having a density less than that of water, thereby allowing plastic body 72 to float within water. Adhesive 74 may be water insoluble and may have sufficient strength to allow plastic body 72 to be attached to the inner surface of side wall 40 without being pulled away when pressure is applied to the plastic body 72. FIG. 3A shows the functioning of check valve 70 when water is flowing into reservoir 44. During the usage depicted in FIG. 3A, sunlight would be shining on side wall 30, as discussed with respect to FIG. 2. Accordingly, water indicated by arrow 76 is flowing into reservoir 44 through opening 46. The water supplies a pressure sufficient to ensure that plastic body 72 contorts or moves, thereby allowing the water to flow through opening 46.

FIG. 3B depicts the check valve 70 functioning when solar energy is no longer available. In this instance, water is no longer flowing through opening 46 because the water is no longer being heated within gap 60. Accordingly, there is insufficient water pressure to displace the plastic body 72 of the check valve 70, and check valve 70 seals opening 46, thereby preventing water from exiting the reservoir 44. This occurs as the less dense check valve 70 floats in the water, and due to the inward sloped of wall 40 attributed to the conical shape thereof, seals the opening 46. Since the water contained by reservoir 44 is greater insulated against the relatively cooler external air than the water contained within gap 60, a greater amount of heat is retained by water within reservoir 44, vis-à-vis, the water present within gap 60. It should be noted that because the relatively warmer water in the reservoir 44 cannot travel out of opening 46 due to the check valve 70, cool water located within gap 60 cannot flow back into reservoir 44 through opening 48. Thus, the presence of check valve 70 prevents reverse flow of water and generally allows the device 10 to maintain a relatively warm water temperature within reservoir 44. It should be noted that in embodiments of the invention, the inventor anticipates the utilization of other check valves known in the art.

Figure 4:
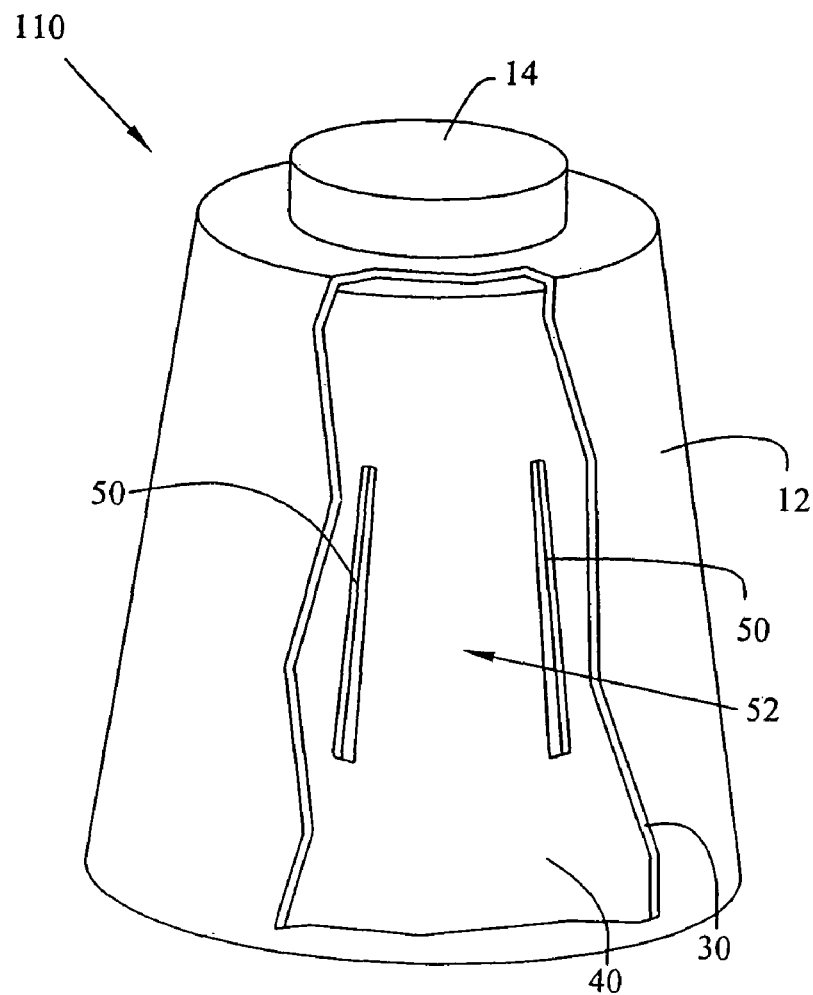
FIG. 4 depicts a perspective view of an embodiment of the present invention with a portion of a wall removed for illustrative purposes.

FIG. 4 depicts a perspective view of another embodiment of the present invention, generally indicated by numeral 110. In this figure, a portion of side wall 30 has been removed in order to show more easily the outer surface of side wall 40 of device 110. In device 110, side wall 40 includes a plurality of ribs, each indicated by numeral 50. The ribs 50 may be integrally formed within the side wall 40. In alternative embodiments of the invention, the ribs 50 may be added to side wall 40 as a separate component and held thereto by an adhesive. The presence of ribs 50 in device 110 ensures that gap 60 is sized consistently throughout device 110. In order to ensure proper functioning of device 110, however, ribs 50 should not extend as far downward as floor 42. This allows a liquid being heated by the device to flow around the periphery of side wall 40 before being directed into channels 52 defined by ribs 50. In addition, ribs 50 should not extend upward as far as the level of opening 46. Thus, the liquid heated by device 110 will be allowed to intermix above ribs 50 before flowing through opening 46 and back into reservoir 44.

Figure 5A:
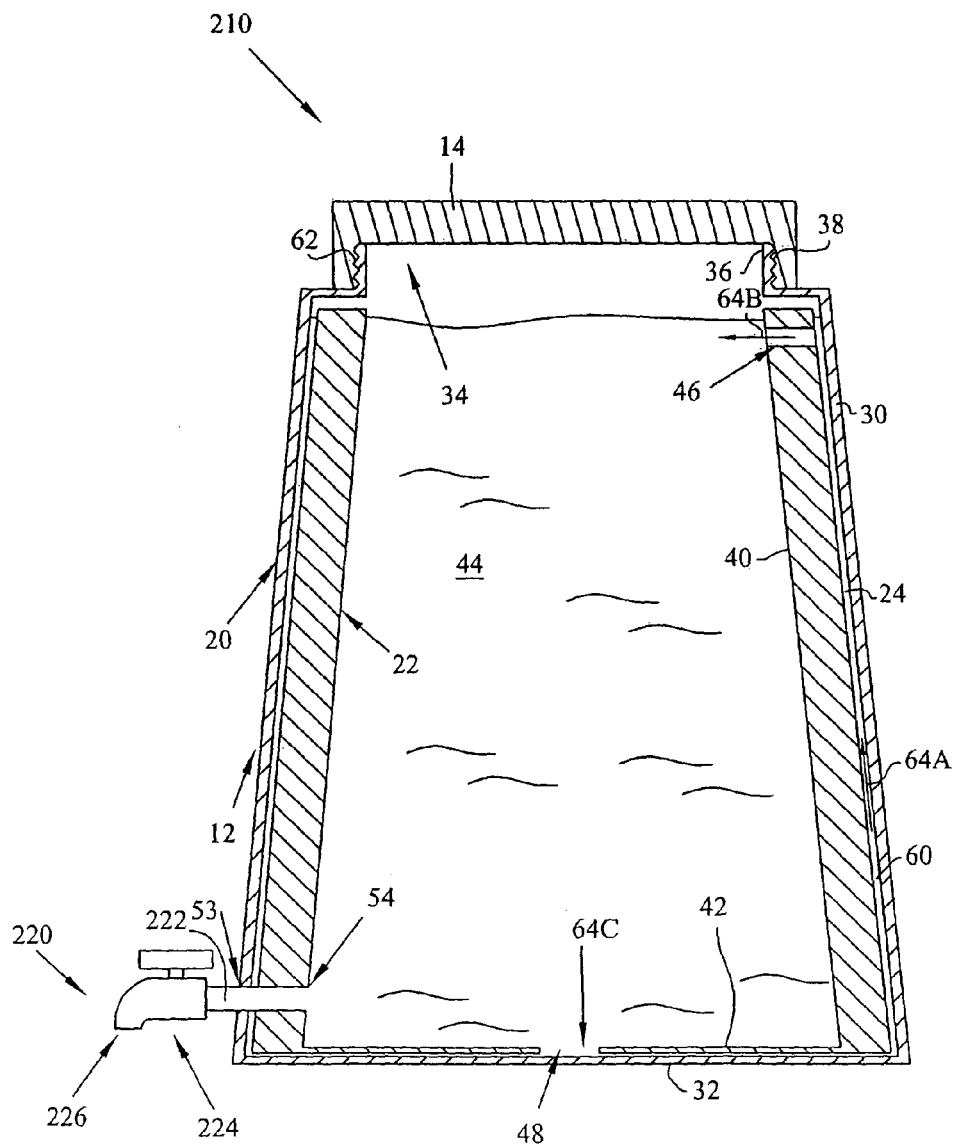
FIG. 5A depicts a sectional view of an embodiment of the present invention.

FIG. 5A depicts a section view of another embodiment of the present invention, generally indicated by numeral 210. In device 210, side wall 30 further includes an additional opening 53, and side wall 40 further includes an additional opening 54. A spigot assembly 220 extends into reservoir 44 through openings 53, 54 in order to allow removal of warm water from reservoir 44. Ideally, spigot assembly 220 is utilized once the liquid within reservoir 44 has reached a relatively constant temperature. Spigot assembly 220 includes tube 222 and valve 224 of a type known in the art. When a user desires to drain all or a portion of the liquid within reservoir 44, the user need only turn on the valve 224 of the spigot assembly 220. This will allow liquid from reservoir 44 to flow through tube 222 and exit out of tube 222 at opening 226. It should be noted that in this embodiment of the invention, in order to ensure device 210 functions properly, liquid must be added to reservoir 44 after removal of liquid through spigot assembly 220, thereby ensuring that the water level rises above the level of opening 46.

Figure 5B:
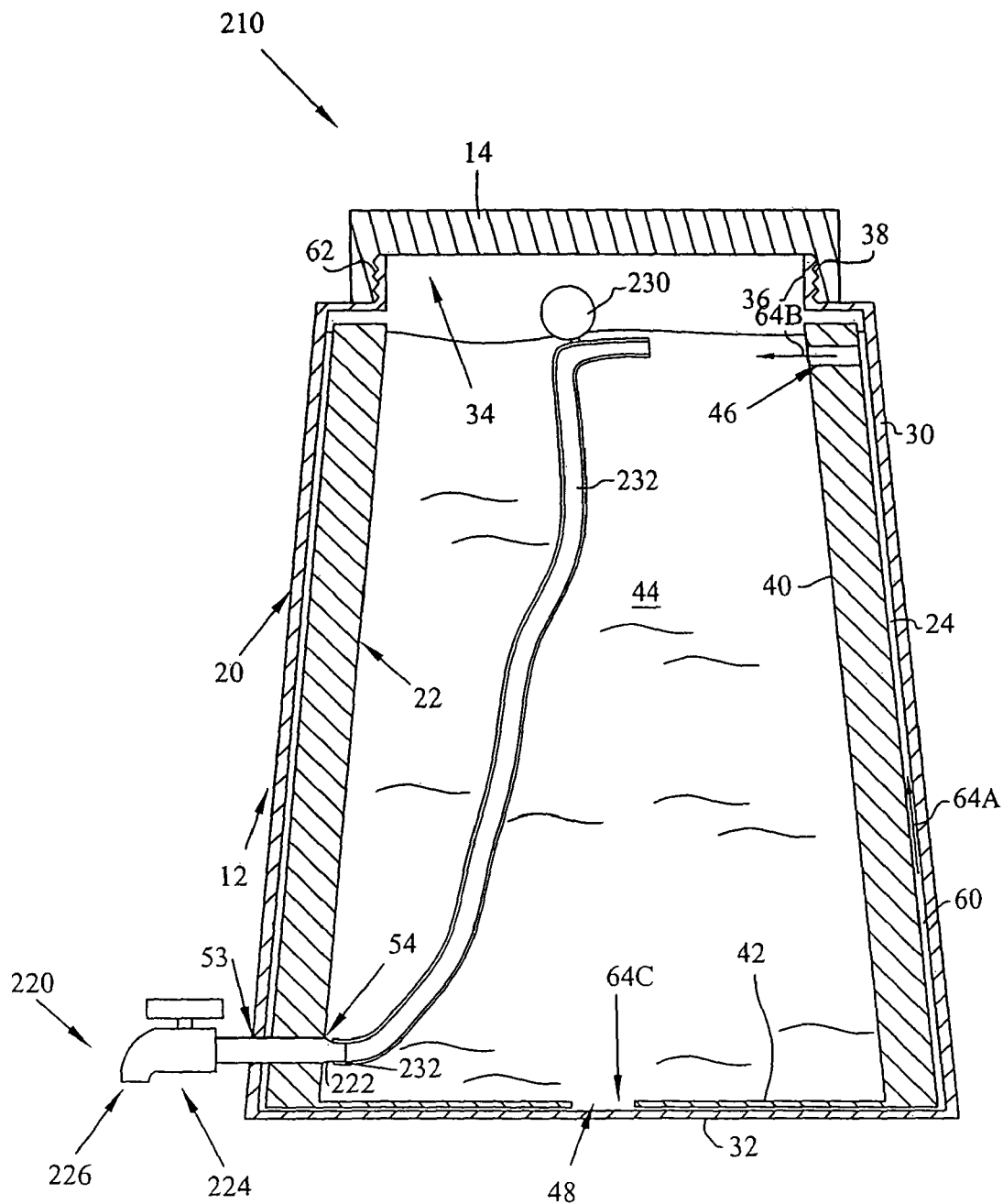
FIG. 5B depicts a sectional view of an alternative of the embodiment of the present invention depicted in FIG. 5A.

FIG. 5B depicts a modified version of the embodiment of the invention depicted in FIG. 5A. In FIG. 5B, device 210 further includes a float 230 and tube 232. Float 230 is comprised of a material less dense than the liquid thereby ensuring float 230 floats on the top of the liquid. Tube 232 may be manufactured from a flexible material, such as plastic. In the present embodiment, one end of tube 232 is attached to tube 222 of spigot assembly 220. If necessary, tube 222 may be elongated in order to ensure a sufficient length of tube 222 extends into reservoir 44. The opposing end of tube 232 is affixed to float 230.

The embodiment of the invention depicted in FIG. 5B generally allows one to drain the warmest liquid from reservoir 44. Specifically, float 230 floats on the top of the liquid contained within reservoir 44. As explained above, due to density differences in the liquid at different temperatures, warmer liquid generally migrates to the upper portion of reservoir 44. Accordingly, the combination of float 230 and tube 232 ensures that generally the top layer of liquid is being drained through spigot assembly 220, thereby ensuring that one is draining the warmest liquid from reservoir 44.

Figure 6:
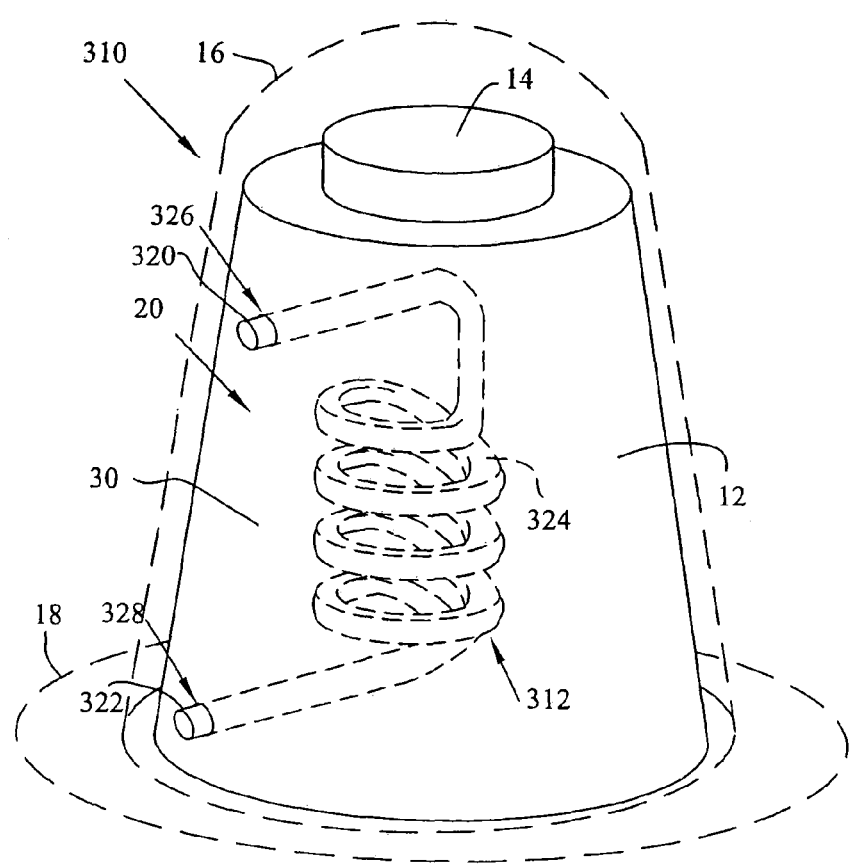
FIG. 6 depicts a perspective view of an embodiment of the present invention with a portion of the components illustrated in phantom for illustrative purposes.

FIG. 6 depicts another embodiment of the invention, generally indicated by numeral 310. Device 310 includes a heat exchanger 312. Heat exchanger 312 includes an outlet pipe portion 320, inlet pipe portion 322 and exchanger portion 324. In addition, in the embodiment of device 310 depicted, wall 30 includes openings 326, 328 and wall 40 (FIG. 2) includes similar openings (not shown). In the embodiment depicted, outlet pipe portion 320 extends through opening 326 and the corresponding opening in wall 40. Similarly, inlet pipe portion 322 extends through opening 328 and the corresponding opening in wall 40. Any sealant known in the art may be used to ensure a liquid tight seal occurs between the pipe portions 320, 322 and the openings 326, 328.

In the present embodiment, exchanger portion 324 resides within reservoir 44. Exchanger portion 324 interconnects the pipe portions 320, 322. Exchanger portion 324 may be manufactured from any material allowing for high heat conductivity, such as copper.

In operation, device 310 may be utilized to heat any fluid capable of flowing through heat exchanger 312. For example, the fluid to be heated enters heat exchanger 312 via pipe portion 322. The fluid then enters the exchanger portion 324. It should be noted that since the liquid within reservoir 44 has been heated by solar energy, as described above, the flow of fluid through exchanger portion 324 allows the fluid to absorb heat energy from the liquid within reservoir 44. The heat energy absorbed by the fluid increases the temperature of the fluid. The fluid then exits heat exchanger 312 via pipe portion 320 at a temperature greater than that of the fluid when the fluid entered heat exchanger 312.

Figure 7:
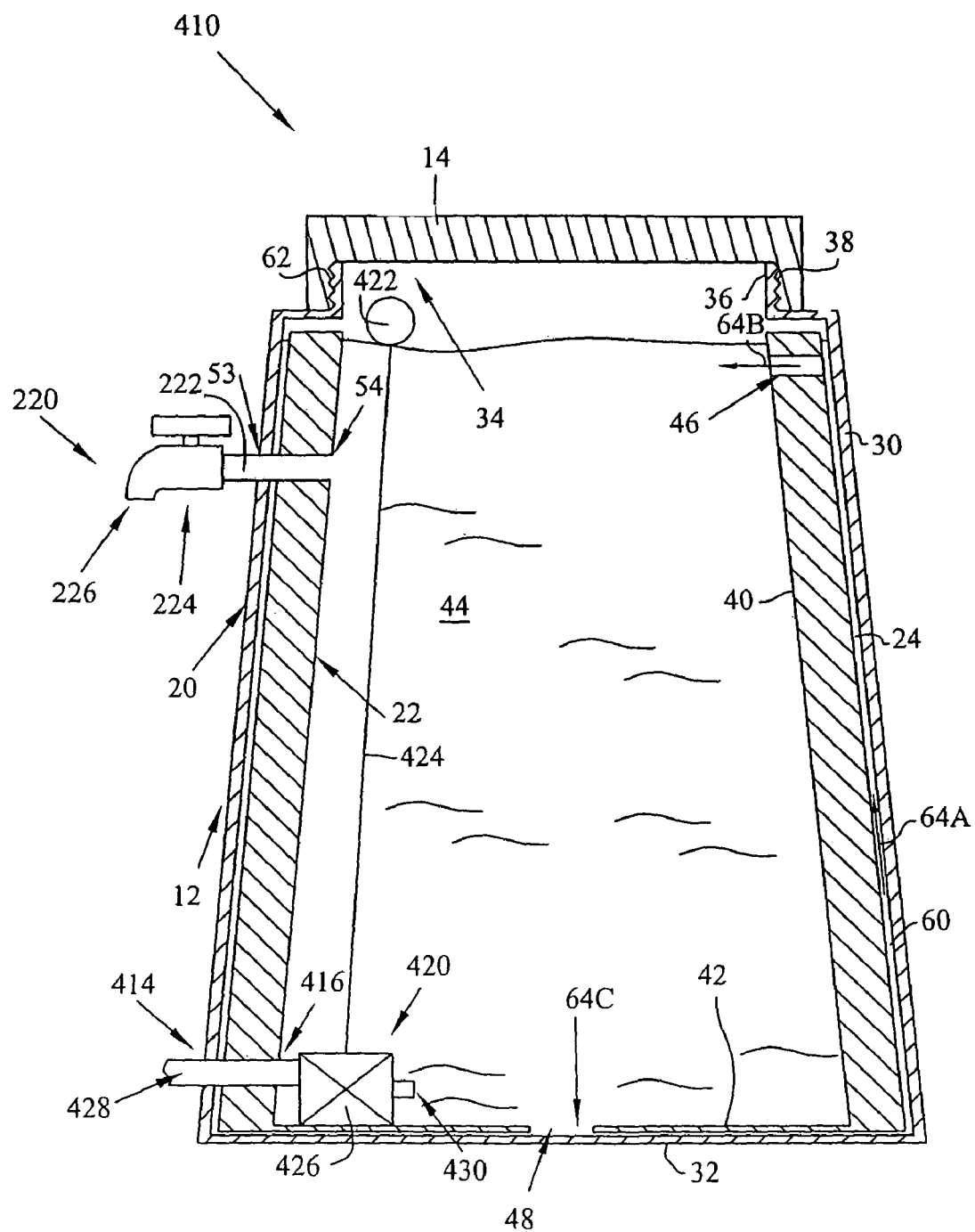
FIG. 7 depicts a sectional view of an embodiment of the present invention.

FIG. 7 depicts another embodiment of the present invention, generally indicated by numeral 410. Device 410 includes spigot assembly 220, as described above. In this embodiment, spigot assembly 220 is positioned proximate the upper surface of the liquid stored within reservoir 44.

Device 410 includes two additional openings 414, 416 and a float valve assembly 420. Float valve assembly 420 may be of any known type. Wall 30 includes opening 414, and wall 40 includes opening 416.

In the present embodiment of the invention, float valve assembly 420 includes a float 422, connection 424, valve 426, inlet pipe 428 and opening 430. Float 422 is comprised of a material with a density allowing float 422 to float on top of the liquid contained within reservoir 44. Connection 424 comprises any connection known in the art and connects float 422 to valve 426 in a known manner. Connection 424 is such that when the level of liquid within reservoir 44 falls to a given level, as measured by float 422, connection 424 activates valve 426. Activation of valve 426 allows additional liquid to flow through valve 426 from inlet 428. The additional liquid then enters reservoir 44 via opening 430. Liquid will continue to flow into reservoir 44 through opening 430 until the liquid reaches a predetermined level. Once this predetermined level is reached, float 422 interacts with connection 424 to shut off valve 426 thereby stopping the flow of liquid into the reservoir 44.

It should be noted that in the present embodiment, spigot assembly 220 is positioned proximate the upper surface of the liquid within reservoir 44. Conversely, valve 426 and inlet 428 are positioned proximate floor 42. As explained above, generally warmer liquid is located at the top of reservoir 44 and cooler liquid is located near the bottom of reservoir 44. Thus, in the present embodiment, spigot assembly 220 draws off warmer liquid from reservoir 44. Moreover, cooler liquid from inlet 428 intermixes with the cooler liquid contained within reservoir 44. The inclusion of additional cooler liquid in the lower portion of reservoir 44 causes relatively warmer liquid to flow upwards in reservoir 44, based upon the difference in density of liquid at different temperatures. Accordingly, in the present embodiment of the invention, spigot assembly 220 is able to draw out the relatively warmer liquid from reservoir 44.

It should be noted that the inventor also anticipates that one may include the float 230 and tube 232 combination depicted in FIG. 5B, with the spigot assembly 220 of the present embodiment. This combination of components allows for flexibility in height when positioning the spigot assembly within body 12.

Figure 8:
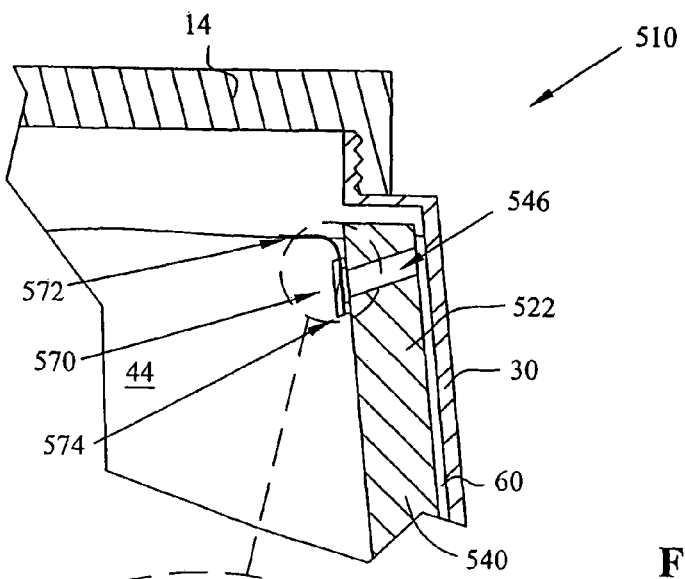
FIG. 8 depicts a partial section view of an embodiment of the present invention.

FIG. 8 depicts another embodiment of the present invention. In FIG. 8, numeral 510 generally indicates an embodiment of the device. Device 510 has a structure substantially similar to that of device 10, depicted in FIGS. 1 and 2 and described above. Thus, for the sake of brevity, only the differences between the embodiment of the device indicated by numeral 10 and the embodiment of the device indicated by numeral 510 will be described. As would be understood by one with ordinary skill in the art, any and/or all of the following differences may be incorporated into any embodiment of the invention whenever suitable, including those embodiments described above.

As shown in FIG. 8, device 510 includes an opening 546. In a manner similar to opening 46, opening 546 extends through side wall 540 of second container 522. In the depicted embodiment, opening 546 is angled downwardly through the side wall 540. Accordingly, the portion of opening 546 located proximate reservoir 44 is located at a lower vertical height than the portion of opening 546 located proximate gap 60. The angled travel of the opening 546 assists in directing substantially the warmest liquid within gap 60 into reservoir 44 while ensuring that the position of at least a portion of valve 570 below the upper liquid level within reservoir 44.

Figure 9:
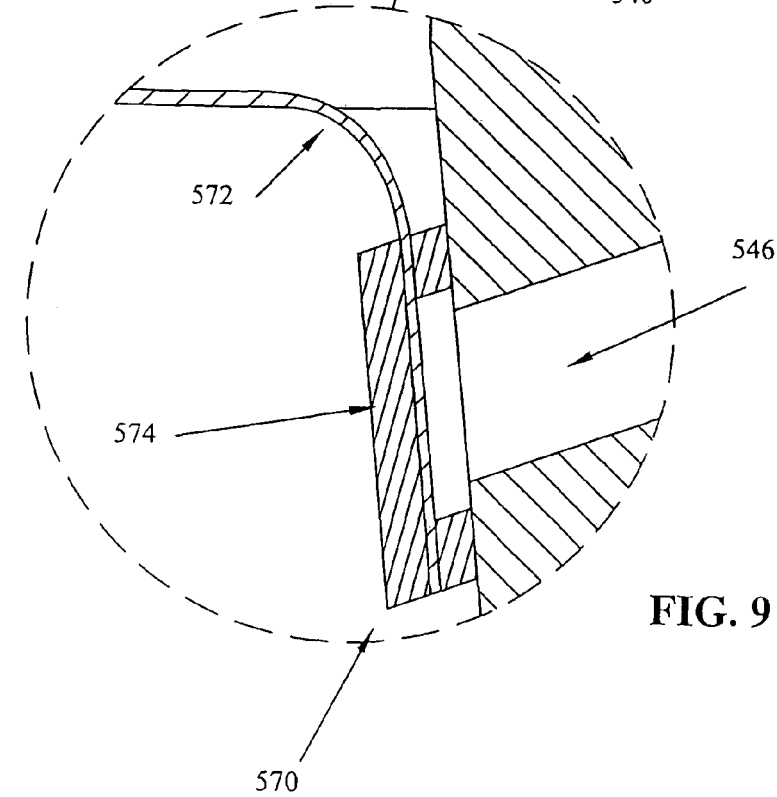
FIG. 9 depicts an enlarged view of a portion indicated in FIG. 8.

With reference to FIGS. 8 and 9, device 510 also includes a check valve, generally indicated by numeral 570. In the depicted embodiment of the invention, check valve 570 includes a body 572 and a base portion 574. Base portion 574 is connected to the side wall 540 of second container 522 proximate opening 546.

Figure 10:
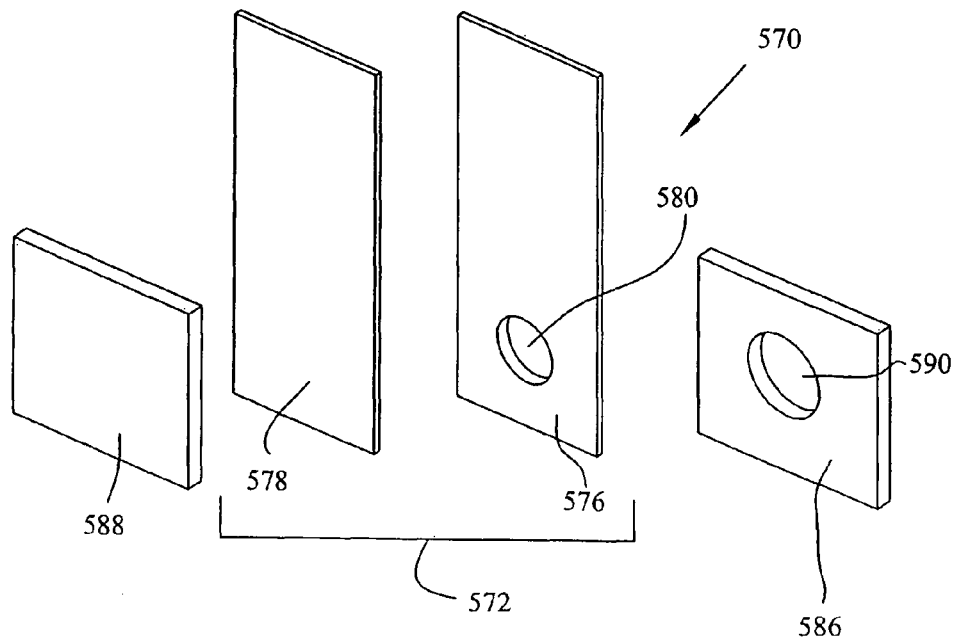
FIG. 10 depicts an exploded perspective view of an embodiment of a valve utilized in an embodiment of the present invention.

FIG. 10 depicts an exploded perspective view of the check valve 570. As shown in FIGS. 9 and 10, body 572 includes a first member 576 and a second member 578. In the depicted embodiment of the invention, the members 576, 578 may be at least partially formed from a polymer material having a density less than that of the liquid present within the reservoir 44 of device 510. For example, the members 576, 578 may be formed from polyethylene with a density less than that of water whenever reservoir 44 contains water. As can be seen in FIG. 10, in the depicted embodiment, member 576 includes an aperture 580. Aperture 580 may be of any suitable size and may be formed in member 576 in any suitable fashion.

With reference still to FIGS. 9 and 10, in the depicted embodiment, base portion 574 includes a first base member 586 and a second base member 588. The base members 586, 588 may be manufactured from any suitable material. In the depicted embodiment, the base members 586, 588 may be formed from any suitable material. In embodiments, base members 586, 588 may be formed form material having higher insulation properties. Furthermore, in the depicted embodiment, base member 586 includes an aperture 590. Aperture 590 is sized approximately equivalent to that of aperture 580 of member 576. In addition, aperture 590 may be formed in approximately the center of member 586. Aperture 590 may be formed within base member 586 in any suitable manner.

Figure 11A:
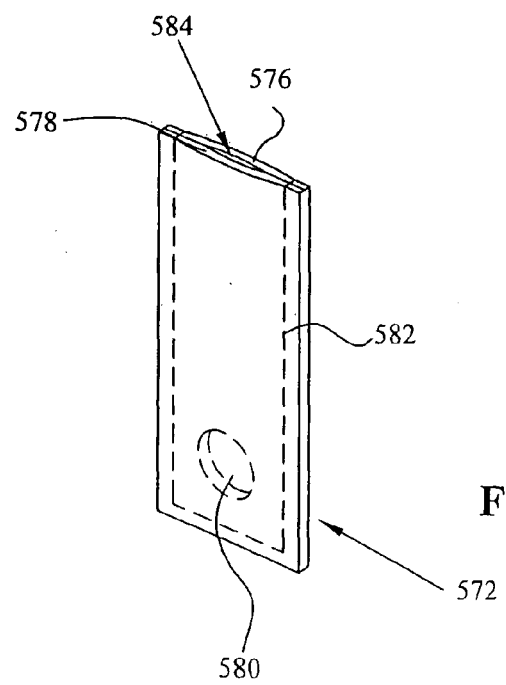
FIGS. 11A-11C depict steps in the assembly of the embodiment of the valve depicted in FIG. 10.
Figure 11B:
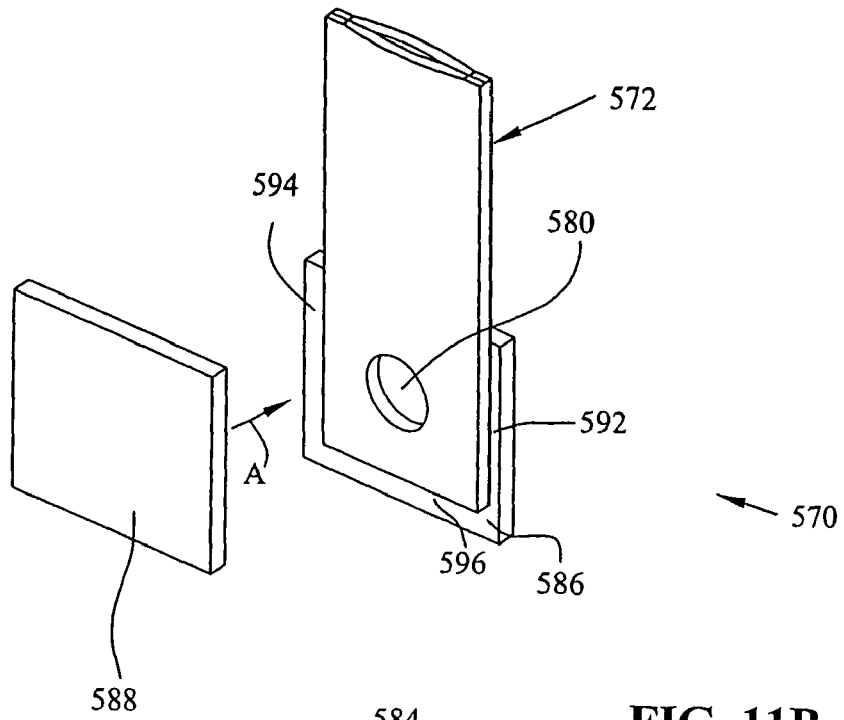
Figure 11C:
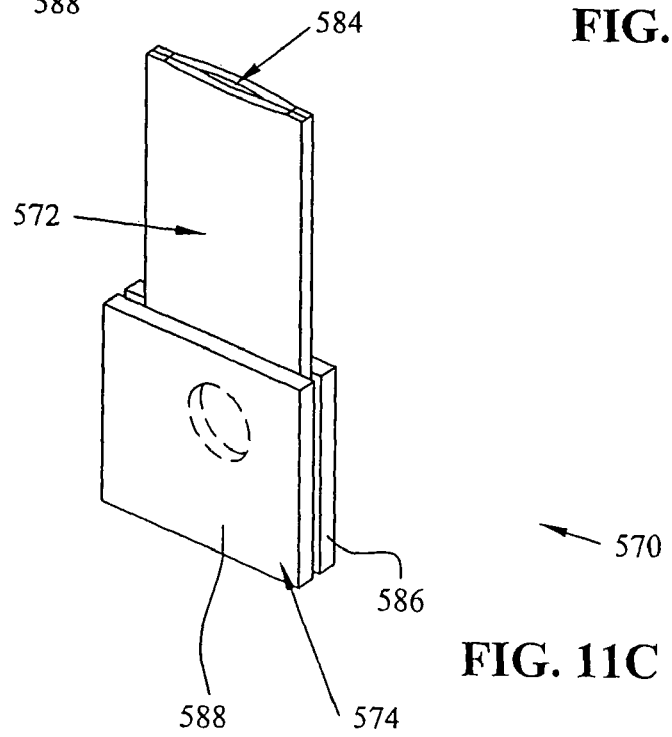

With reference now to FIGS. 11A through 11C, a method of assembling valve 570 will now be set forth. It should be noted that the following description is being provided for exemplary purposes only. Any suitable method for the assembly of valve 570 may be utilized.

In order to assemble body portion 572, member 576, including aperture 580, is aligned with member 578. The members 576, 578 may be connected in any suitable manner, such as with an adhesive, for example, to form a seal 582. In suitable embodiments, the members 576, 578 may be joined by applying heat so as to form seal 582 and affix the members 576, 578 to each other. Since the members 576, 578 are joined proximate the side and lower edges but not the top edges, an opening, generally indicated by numeral 584 is formed between the top edge of the members 576, 578.

Referring now to FIG. 11B, body portion 572 is placed between the members 586, 588 so that the aperture 580 aligns with aperture 590. As shown in FIG. 11B, the members 586, 588 are sized, with respect to body portion 572, so that the members 586, 588 includes side edges 592, 594 and a lower edge 596 that extend beyond body portion 572. Any suitable mechanism may be utilized to connect member 586 to member 588, such as an adhesive, for example. In embodiments utilizing an adhesive, the adhesive may be added to edges 592, 594, 596. Once the adhesive has been added to member 586, member 588 may be moved in the direction of arrow "A" until member 588 contacts 586 to join member 586 to member 588, as depicted in FIG. 11C. Once the members 586, 588 have been joined, at least a portion of body portion 572 extends through a gap intermediate the members 586, 588. It should be noted that the members 586, 588 are joined in a manner allowing the flow of liquid through body portion 572.

Valve 570 may now be affixed to device 510. Referring now to FIGS. 8 and 9, it should be noted that valve 570 is positioned within device 510 so that the apertures 580, 590 are substantially in alignment with aperture 546. The valve 510 may be attached to the inner surface of side wall 540 in any suitable manner, such as with an adhesive, for example.

Device 510 functions in a manner substantially similar to device 10, described above. Accordingly, only the function of device 510 with respect to valve 570 and opening 546 will be described. As explained previously, when a liquid, such as water, is contained within device 510, heat absorbed by device 510 will cause the temperature of the liquid within gap 60 to rise. The warmer liquid will traverse opening 546 in a manner similar to the manner in which warmer liquid traverses opening 46 as described above. The warmer liquid exits opening 546 and enters valve 570 through aperture 590. The warmer liquid will then pass into body portion 572 through aperture 580. The pressure associated with the flow of the warmer liquid will force the liquid through body portion 572 until the relatively warmer liquid exits through opening 584 and flows into reservoir 44.

As explained previously, as the liquid within gap 60 cools, the liquid will attempt to flow in a reverse direction. In the depicted embodiment, when the liquid within reservoir 44 first begins to flow in the reverse direction, the pressure will cause the opening 584 of valve 570 to close. The closing of opening 584 prevents the liquid from flowing into valve 570 from reservoir 44, and thus, valve 570 prevents reverse flow from reservoir 44 into gap 60. In addition, base portion 574 may act as an insulator to prevent the transfer of heat from the relatively warmer liquid within reservoir 44 to the relatively cooler liquid within gap 60.

In the depicted embodiment of device 510, body 572 of valve 570 is of sufficient length so that at least a portion of body 572 floats along the top surface of the liquid within reservoir 44. It should be noted that in embodiments of the invention, body 572 may be of a slightly shorter length. Furthermore, in embodiments of the invention, body 572 may be of a length so that body 572 floats in the direction of the top surface of the liquid within reservoir 44 without actually reaching the top surface of the liquid. Generally, if body 572 does not extend a significant distance to reach the top of the surface of the liquid within reservoir 44, lesser pressure is required by the liquid within gap 60 to open valve 570 than would be required in embodiments of valve 570 in which at least a portion of body 572 floats along the top surface of reservoir 44, such as the valve 570 depicted in FIG. 8. It should further be noted that in embodiments of valve 570, body 572 will extend along the inner surface of side wall 540 at an angle with respect to the vertical. In general, the greater the angle that body 572 extends with respect to vertical, the greater the pressure that will be required by the liquid within gap 60 to open the valve 570.

As should be clear, since valve 570 prevents the reverse flow of the liquid as the liquid cools, valve 570 may be employed in order to substantially prevent or slow the reverse flow in other embodiments of the invention. Furthermore, the valve 570 and slanted opening 546 need not be used in combination.

Figure 12:
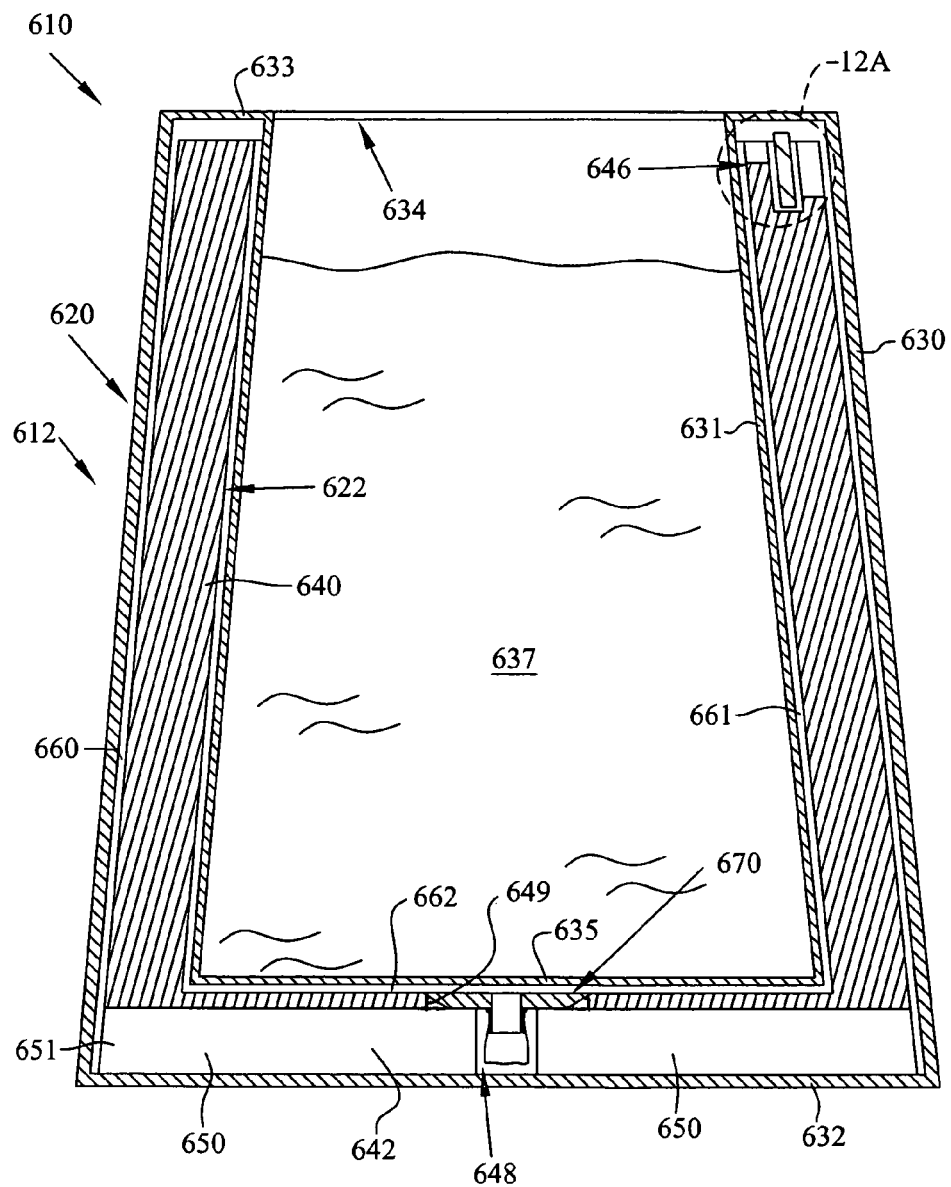
FIG. 12 depicts a sectional view of another embodiment of the present invention.
Figure 14:
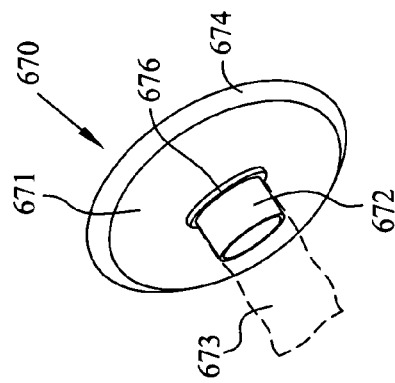
FIG. 14 depicts a perspective view of a check valve of the present invention.

FIG. 12 depicts a section view of an alternate embodiment self-contained solar heater and storage device, generally indicated as 610. In this embodiment, heater and storage device 610 includes a body portion, generally indicated by numeral 612. Body portion 612 includes a first container, generally indicated as 620, and a second container, generally indicated as 622. First container 620 includes an outer side wall 630, an inner side wall 631, an outer floor 632, and an upper wall 633. In the present embodiment, side walls 630 and 631 have a conical configuration. As should be appreciated, a cross-section of the side walls perpendicular to a longitudinal axis of container 622 will have a circular or circumferential configuration and any use of the term circumferential herein refers to such a circular configuration. First container 620 further includes an opening, generally indicated as 634, and an inner floor 635. Outer floor 632 mates with outer side wall 630 along the lower edge thereof, and inner floor 635 mates with inner side wall 631 along its lower edge in such a manner that there is a liquid tight seal between the respective floors and side walls. Likewise, upper wall 633 mates with side walls 630 and 631 at the upper ends of the side walls in such a manner to ensure a liquid tight seal. It should further be appreciated that opening 634 is at the opposite end of first container 620 than floors 632 and 635. Furthermore, inner side wall 631 and inner floor 635 define an inner area or reservoir, 637.

At least side wall 630 of container 620 is manufactured from a material capable of absorbing solar energy, such as metal or plastic, for example. A suitable plastic may be polyethylene. It is preferable that the material have maximum solar absorption capability and thus, side wall 630 may be of a thinner cross-section than would be utilized in an application in which the outer wall provided insulation. The outer surface of side wall 630 may be colored black or be of another dark color in order to achieve maximum solar energy absorption.

Second container 622 includes a side wall 640 and a floor 642. The connection between side wall 640 and floor 642 is liquid tight and prevents liquid from flowing there between. In addition, side wall 640 has a conical-shaped configuration as depicted in FIG. 12.

Side wall 640 and floor 642 may include or be manufactured from an insulative material having a relatively thicker cross-section, such as a plastic, polystyrene, or polyurethane.

Figure 13:
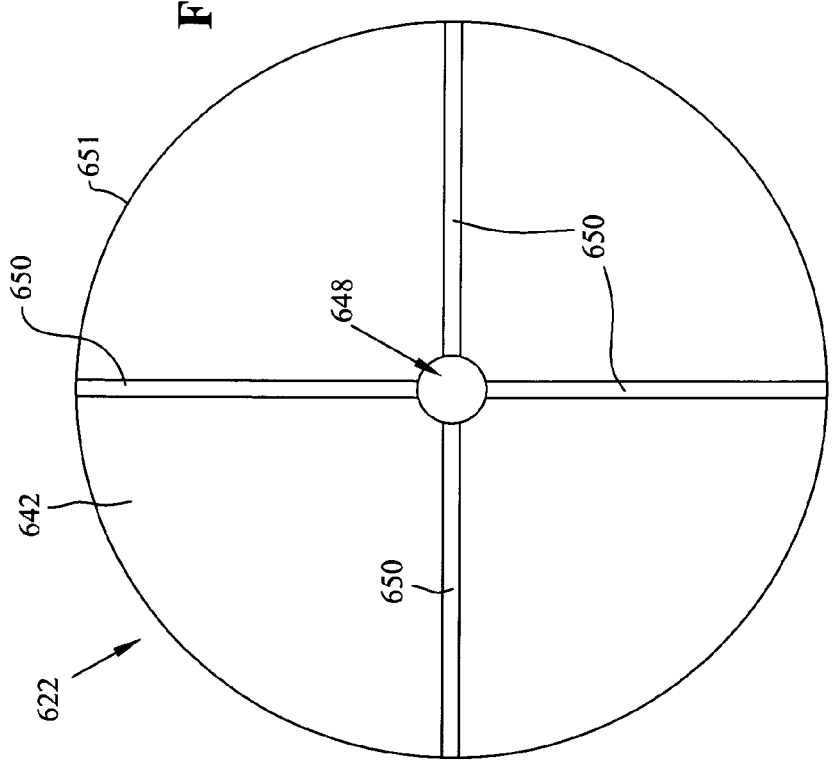
FIG. 13 depicts a bottom view of the inner container of the heater of FIG. 12.

Side wall 640 includes an opening, generally indicated as 646. In the present embodiment, opening 646 is located in side wall 640 at an end opposite where side wall 640 joins with floor 642. In addition, floor 642 also includes an opening, generally indicated as 648. In the embodiment depicted, opening 648 is located in the center of floor 642. Opening 648 also includes a counterbore 649 for receipt of a check value, as discussed below. Referring still to FIG. 12, second container 622 is sized and configured to be received within first container 620 with side wall 640 between side walls 630 and 631 and floor 642 between floors 632 and 635. In addition, as shown in FIGS. 12 and 13, floor 642 includes slots 650. In the embodiment shown, floor 642 includes four slots 650 extending in a radial manner from opening 648 to an outer edge 651 of floor 642. In this embodiment, the four slots 650 are arc spaced at an angle of approximately 90° from one another; however, it should be appreciated that fewer or more slots may be provided.

Again referring to FIG. 12, a gap 660 is formed between and defined by side walls 640 and 630, and a gap 661 is formed between and defined by side walls 631 and 640. A gap 662 is formed between and defined by inner floor 635 of first container 620 and floor 642 of second container 622. It should be noted that opening 646 extends and provides communication between gaps 660 and 661. It should further be noted that gaps 660, 661 and 662 are substantially constant about the circumference of device 610 and along floor 642.

Now referring to FIGS. 12A-12C, details of opening 646 are shown. Opening 646 is located at the top of wall 640 and is configured to provide a baffle arrangement, generally indicated as 653, including a baffle plate 654. The baffle arrangement in opening 646 includes an outer wall portion 656, an inner wall portion 657 and a central portion 658. As can be seen in FIG. 12A, baffle plate 654 is placed between outer wall portion 656 and inner wall portion 657 and above central wall portion 658. Furthermore, baffle plate 654 is mounted in slots 659a and 659b in side wall 640 which extend down almost to but stop short of central wall portion 658, as best shown in FIG. 12C. This arrangement provides a flow path, generally indicated as 665, that provides communication between liquid in gaps 660 and 661, as discussed below. Also, as is clearly evident in FIGS. 12A and 12B, it should be noted that inner wall portion 656 extends higher than outer wall portion 657 on baffle arrangement 653.

Device 610 also includes a check valve, generally indicated as 670 (see FIGS. 12 and 14-16). In this embodiment, check valve 670 includes a base 671, a hollow extension 672, and a flexible member 673. Base 671 includes a chamfer 674 and central opening 675. Hollow extension 672 is attached to base 671 and extends around opening 675. Furthermore, in this embodiment, flexible member 673 is mounted to extension 672 with an elastic member or O-ring 676. It should however be appreciated that other attachment techniques may be utilized, such as an adhesive, band, or clip. Also, in this embodiment, opening 675 and extension 672 have an elliptical configuration, as best shown in FIG. 16. As shown in FIG. 12, check valve 670 is inserted in opening 648 of floor 642 with extension 672 and flexible member 673 pointing down towards outer floor 632. Base 671 is inserted into counterbore 649 and a mating surface to chamfer 674 may be included in the counterbore. Alternately, the counterbore 649 may be provided in a slightly smaller diameter than base 671. Accordingly, if the counterbore in floor 642 is in a soft material, such as polystyrene, a press fit may be created when base 671 is inserted into counterbore 649. Flexible member 673 may be manufactured from a material, such as urethane, in a thickness of approximately 3 mils. Also, in the embodiment shown, the length of flexible member 673 is approximately 6 to 8 times the width of the base around extension 672.

In operation, solar heater and storage device 610 functions as a heat exchanger. The cavity between first container 620 and second container 622 (i.e., gaps 660, 661, 662) and slots 650 may be filled with a liquid, which may be water, before the unit is sealed. It should also be appreciated that an opening or plug (not shown) may be provided in first container 620 so that the liquid contained therein can be replaced or the amount adjusted. In addition, reservoir 637 formed by side wall 631 and floor 635 is also filled with a liquid that is desired to be heated for use thereof.

As solar heater 610 is heated by sun rays falling on outer side wall 630, the liquid in gap 660 is heated, and the hotter liquid rises to the top thereof. The hot water will flow through opening 646 and baffle arrangement 653 into gap 661 forcing colder water in gap 661 towards the floor and gap 662. The cold water then flows from gap 662 through opening 675 in check valve 670 and back out to gap 660 via slots 650 in floor 642. The colder water flowing into gap 630 will be heated and rise to the top of gap 630 and flow to continue the heating cycle discussed above. Furthermore, hot water entering gap 661 will warm liquid in reservoir 637, as side wall 631 is thin enough to permit heat transfer between the liquid in gap 661 and reservoir 637. As should be appreciated, transfer of heat to the liquid in reservoir 637 will result in additional cooling of the liquid gap in 661 as it flows downward into gap 662 and opening 648.

Once the sun goes down or is otherwise obscured, heating of liquid in gap 660 through side wall 630 will cease and liquid in gap 660 may start to cool down. Baffle arrangement 653 and check valve 670 prevent the liquid in the gaps from circulating in the opposite direction thereby preventing the system from cooling down the liquid in reservoir 637. This is accomplished by check valve 670, which opens to allow liquid to flow from gap 662 down into slots 650 at a pressure of approximately 0.002 psi when the sun is warming device 610; however, as the flow would tend to reverse upon cooling of water in gap 660, the pressure in flexible member 673 will drop and the ends of the flexible member will come together to prevent reverse flow of the liquid as shown in FIG. 15A. It should also be appreciated that baffle arrangement 653 protects against exchange of liquid between gaps 661 and 660 when side wall 630 is not being heated and check valve 670 is closed as upper side wall portions 656 is higher than inner side wall portion 657. This and baffle plate 654 prevent exchange of liquid between the gaps when the outer side wall is not being heated.

It should also be appreciated that an advantage of this embodiment is the ability to provide and heat a potable liquid in reservoir 637, which can be readily cleaned and disinfected through opening 634. It should also be realized that a cap, such as cap 14, and cover, such as cover 16 on device 10, may be provided for insulation and to prevent contamination of a liquid in reservoir 637.

Now referring to FIG. 17, another alternate embodiment of self-contained heater and storage device is shown, generally indicated as 710. In this embodiment, heater and storage device 710 includes a body portion, generally indicated by numeral 712. Body portion 712 includes a first container, generally indicated as 720, and a second container, generally indicated as 722. First container 720 includes an outer side wall 730, an inner side wall 731, an outer floor 732, and an upper wall 733. In the present embodiment, side walls 730 and 731 have a hemispherical configuration. First container 720 further includes an opening, generally indicated as 734, and an inner floor 735. Outer floor 732 mates with outer side wall 730 along the lower edge thereof, and inner floor 735 mates with inner side wall 731 along its lower edge in such a manner that there is a liquid tight seal between the respective floors and side walls. Likewise, upper wall 733 mates with side walls 730 and 731 at the upper ends of the side walls in such a manner to ensure a liquid tight seal. It should further be appreciated that opening 734 is at the opposite end of first container 720 than floors 732 and 735. Furthermore, inner side wall 731 and inner floor 735 define an inner area or reservoir, 737.

Second contained heater 722 includes a side wall 740 and a floor 742. The connection between side wall 740 and floor 742 is liquid tight and prevents liquid from flowing there between. In addition, side wall 740 has a conical-shaped configuration as depicted in FIG. 17.

Side wall 740 and floor 742 may include or be manufactured from an insulative material having a relatively thicker cross-section, such as a plastic, polystyrene, or polyurethane.

Side wall 740 includes an opening, generally indicated as 746. In the present embodiment, opening 746 is located in side wall 740 at an end opposite where side wall 740 joins with floor 742. In addition, floor 742 also includes an opening, generally indicated as 748. In the embodiment depicted, opening 748 is located in the center of floor 742. Opening 748 also includes a counterbore 749 for receipt of a check value, as discussed below. Referring still to FIG. 17, second container 722 is sized and configured to be received within first container 720 with side wall 740 between side walls 730 and 731 and floor 742 between floors 732 and 735. In addition, as shown in FIG. 17, floor 742 includes slots 750. In the embodiment shown, floor 742 includes four slots 750 extending in a radial manner from opening 748 to an outer edge 751 of floor 742. In this embodiment, the four slots 750 are arc spaced at an angle of approximately 90° from one another; however, it should be appreciated that fewer or more slots may be provided.

Again referring to FIG. 17, a gap 760 is formed between and defined by side walls 740 and 730, and a gap 761 is formed between and defined by side walls 731 and 740. A gap 762 is formed between and defined by inner floor 735 of first container 720 and floor 742 of second container 722. It should be noted that opening 746 extends and provides communication between gaps 760 and 761. It should further be noted that gaps 760, 761 and 762 are substantially constant about the circumference of device 710 and along floor 742.

Solar heater 710 includes a similar baffle arrangement in opening 747 to that of baffle arrangement 653 in solar heater 610. Solar heater 710 also includes a similar check valve 770, such as check valve 670 in solar heater 610. The use and operation of the solar heater 710 is the same as with solar heater 610.

While this invention has been described as having an exemplary design, the present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains. For example, it is contemplated that the solar heater depicted in FIGS. 12 and 17 may include a design wherein the walls of the second container and the inner walls of the first container extend substantially vertically or so that reservoir 637 is slightly smaller at the bottom towards floor 635 than at opening 634. This would facilitate injection molding the first container around the second container.

The invention claimed is:
1. A solar heater for heating a liquid including:
a first container having an inner side wall, an outer side wall, an outer floor, an inner floor, and an upper wall connecting said inner side wall and said outer side wall, said inner side wall and said inner floor defining a reservoir external to said inner and outer side walls;
a second container having a side wall and a floor, said second container contained within said first container and in a space defined between said inner and outer side walls and said inner and outer floors;
a first gap between said first container outer side wall and said second container side wall;
a second gap between said first container inner side wall and said second container side wall; and
a third gap between said inner floor of said first container and said floor of said second container.

2. The solar heater for heating a liquid as set forth in claim 1, further including an opening in said side wall of said second container, an opening in said floor of said second container, and a check valve mounted in said opening of said second container allowing water to flow from said third gap to said first gap, but restricting flow in an opposite direction.

3. The solar heater for heating a liquid as set forth in claim 2, wherein the opening in said side wall of the second container includes a baffle configuration having a baffle plate and an inner wall portion that extends higher than an outer wall portion.

4. The solar heater for heating a liquid as set forth in claim 3, wherein said baffle configuration also includes a central wall portion in said side wall of said second container, and said baffle plate is mounted in slots in said side wall of said second container, said slots extending below said outer wall portion and said inner wall portion and close to but not down to said central wall portion.

5. The solar heater for heating a liquid as set forth in claim 4, wherein said floor of said second container includes slots extending in a radial direction from said opening to an outer edge of said floor in said second container to provide a path for liquid to communicate between said third gap and said first gap.

6. The solar heater for heating a liquid as set forth in claim 2, wherein said inner side wall and said inner floor of said first container define a reservoir for containing a liquid intended to be heated.

7. The solar heater for heating a liquid as set forth in claim 6, wherein a liquid is contained in said first, second, and third gaps, but said liquid is not in contact with said liquid in said reservoir.

8. The solar heater for heating a liquid as set forth in claim 7, wherein heat is transferred from liquid in said second gap and said third gap to liquid in the reservoir through said inner side wall and said inner floor of said first container.

9. A solar heater for heating a liquid including:
a first container having an upright wall;
a second container located within the first container and including an upright wall, both of said walls having a generally circular cross-sectional configuration in a direction generally perpendicular to an axis of the containers;
a gap intermediate the wall of the first container and the wall of the second container; and
a check valve mounted in an aperture extending through said floor in said second container, said check valve including a base portion having an opening there through, a hollow extension attached and extending at an angle to said base and surrounding said opening, and a flexible member attached to said extension, wherein said base is rigid and includes a flange having a chamfer around an outer edge thereof, said flange extending generally perpendicular to said extension, and said extension on said base of said check valve has an elliptical configuration.

10. The solar heater for heating a liquid as set forth in claim 9, wherein said aperture includes a counterbore, and said base is mounted in said counterbore.

11. The solar heater for heating a liquid as set forth in claim 10, wherein said flexible member has a length approximately 6 to 8 times the width of the extension.

12. The solar heater for heating a liquid as set forth in claim 9, wherein said opening in said base portion of said extension is also elliptical.

13. A solar heater for heating a liquid including:
a first container having a first upright wall, a second inner upright wall, an outer floor connected to said first upright wall, an inner floor connected to said inner upright wall, and an upper wall connecting said upright walls;
a second container located within the first container and including an upright wall, both of said walls having a generally circular cross-sectional configuration in a direction generally perpendicular to an axis of the containers;
a gap intermediate the wall of the first container and one of the walls of the second container; and
a check valve mounted in an aperture extending through said floor in said second container, said check valve including a base portion having an opening there through, a hollow extension attached and extending at an angle to said base and surrounding said opening, and a flexible member attached to said extension.

14. The solar heater for heating a liquid as set forth in claim 13, wherein said upright wall of said second container encompasses said inner wall of said first container defining a second gap, and a third gap is formed between said inner floor of said first container and a floor of said second container.

15. The solar heater for heating a liquid as set forth in claim 9, further including an opening in said upright wall of said second container and a baffle arrangement contained in said opening to regulate flow of the liquid through the opening.

16. The solar heater for heating a liquid as set forth in claim 15, wherein said baffle arrangement includes a baffle plate mounted between an inner wall portion and an outer wall portion of said baffle arrangement and wherein said inner wall portion extends higher than said outer wall portion.

17. The solar heater for heating a liquid as set forth in claim 16, wherein said upright wall of said second container includes slots in which said baffle plate is mounted, said slots extending below said inner wall portion and said outer wall portion but stopping short of a central portion, thereby defining a flow path through said opening in said side wall of said second container.

18. The solar heater for heating a liquid as set forth in claim 9, wherein the cross-sectional configuration forms three concentric circular rings with the wall of the second container forming an inner ring, the wall of the first container forming an outer ring, and liquid in the gap forming a ring in between the inner and outer rings.

* * * * *